| (12) | United States Patent | (10) Patent No.: | US 9,952,616 B2 |
|---|---|---|---|
| | Akaho | (45) Date of Patent: | Apr. 24, 2018 |

(54) DIFFERENTIAL CIRCUIT INCLUDING A CURRENT MIRROR

(71) Applicant: Rohm Co., Ltd., Kyoto (JP)

(72) Inventor: Tadashi Akaho, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 122 days.

(21) Appl. No.: 15/017,859

(22) Filed: Feb. 8, 2016

(65) Prior Publication Data

US 2016/0231767 A1 Aug. 11, 2016

(30) Foreign Application Priority Data

Feb. 10, 2015 (JP) .................................. 2015-024282
Feb. 10, 2015 (JP) .................................. 2015-024291

(51) Int. Cl.
*G05F 3/26* (2006.01)
*H02M 1/32* (2007.01)
*H02M 1/00* (2006.01)

(52) U.S. Cl.
CPC .............. *G05F 3/262* (2013.01); *H02M 1/32* (2013.01); *H02M 2001/0009* (2013.01)

(58) Field of Classification Search
CPC .. G05F 3/262; H02M 2001/0009; H02M 1/32
See application file for complete search history.

(56) References Cited

U.S. PATENT DOCUMENTS

| 5,334,949 A * | 8/1994 | Sone .................... H03F 3/45076 330/252 |
| 5,341,037 A * | 8/1994 | Miki ..................... G11C 27/026 327/91 |
| 5,936,460 A * | 8/1999 | Iravani .................... G05F 3/262 323/312 |
| 2008/0094050 A1* | 4/2008 | Sugai ......................... G05F 3/16 323/316 |
| 2009/0144689 A1* | 6/2009 | Abadeer ............. G06F 17/5063 716/116 |
| 2009/0179890 A1* | 7/2009 | Nishimura ........... G09G 3/3688 345/214 |
| 2011/0128073 A1* | 6/2011 | Fukuda ................. H01L 27/092 327/566 |
| 2012/0176198 A1* | 7/2012 | Tanaka .................... G05F 3/262 330/288 |

FOREIGN PATENT DOCUMENTS

| JP | 2009-156835 | 7/2009 |
| JP | 2013-030830 | 2/2013 |

* cited by examiner

*Primary Examiner* — Jeffrey Gblende
*Assistant Examiner* — David A. Singh
(74) *Attorney, Agent, or Firm* — Fish & Richardson P.C.

(57) ABSTRACT

A differential circuit includes a first constant current circuit, a second constant current circuit having the same constant current value as the first constant current circuit, a current mirror including a first transistor having a current sink terminal connected to the first constant current circuit, a current drain terminal to which a first input voltage is applied, and a gate short-circuited to the current sink terminal, and a second transistor having a gate connected to the current sink terminal of the first transistor and a current drain terminal to which a second input voltage is applied, and a current output terminal connected to a connection node between a part in which a current based on an output current of the current mirror flows and the second constant current circuit.

11 Claims, 15 Drawing Sheets

DIFFERENTIAL CIRCUIT INCLUDING A CURRENT MIRROR

CROSS-REFERENCE TO RELATED APPLICATIONS

This nonprovisional application claims priority under 35 U.S.C. § 119(a) on Patent Applications No. 2015-024282 and No. 2015-024291 filed in Japan on Feb. 10, 2015, the entire contents of which are hereby incorporated by reference.

BACKGROUND OF THE INVENTION

Field of the Invention

The present invention relates to a differential circuit.

Description of Related Art

Conventionally, there is known a differential circuit, which outputs a current corresponding to a difference between two input voltages. FIG. 14 illustrates an example of a conventional differential circuit.

A conventional differential circuit DF100 illustrated in FIG. 14 includes transistors 101 to 108 and a constant current circuit 109. Sources of the transistors 101 and 102, which are P-channel MOS field effect transistors (MOSFETs) forming a differential pair, are connected to an application terminal of a power supply voltage via the constant current circuit 109. An input voltage Vp is applied to a gate of the transistor 101, and an input voltage Vm is applied to a gate of the transistor 102.

The transistor 103 as an N-channel MOSFET having short-circuited drain and gate and the transistor 104 as an N-channel MOSFET constitute a first current mirror, and the drain of the transistor 103 is connected to a drain of the transistor 101. Sources of the transistors 103 and 104 are connected to a ground terminal.

The transistor 105 as an N-channel MOSFET having short-circuited drain and gate and the transistor 106 as an N-channel MOSFET constitute a second current mirror, and the drain of the transistor 102 is connected to a drain of the transistor 105. Sources of the transistors 105 and 106 are connected to the ground terminal.

The transistor 107 as a P-channel MOSFET having short-circuited drain and gate and the transistor 108 as a P-channel MOSFET constitute a third current mirror, the drain of the transistor 107 is connected to a drain of the transistor 106, and a drain of the transistor 108 is connected to a drain of the transistor 104. Sources of the transistors 107 and 108 are connected to the application terminal of the power supply voltage. A connection node between the drain of the transistor 108 and the drain of the transistor 104 is connected to an output terminal Tout.

Drain currents flow in the transistors 101 and 102 in accordance with a ratio between input voltages Vp and Vm. Further, an output current I101 flows by the first current mirror in accordance with an input of the drain current flowing in the transistor 101. Further, an output current I102 flows by the second current mirror and the third current mirror in accordance with an input of the drain current flowing in the transistor 102.

Essentially, if the input voltage Vp is the same as the input voltage Vm, the output current I101 and the output current I102 are balanced, and no current is output from the output terminal Tout. Actually, however, a balance between the output current I101 and the output current I102 may be lost due to characteristic variations of the transistors 101 and 102 forming the differential pair. In other words, a current may be output from the output terminal Tout so that an offset may occur.

Accordingly, it is considered to suppress the characteristic variations so as to suppress the offset by increasing gate widths of the transistors Vp and Vm and/or by decreasing gate lengths of the same so as to increase gains. However, in this case, there is a problem that response speeds are decreased when the gains are increased so that mirror capacitances are increased.

Accordingly, as illustrated in FIG. 15, for example, a structure including a constant current circuit 110, transistors 111 and 112, and resistors 113 and 114 may be disposed in the preceding stage of the transistors 101 and 102 illustrated in FIG. 14, and in the further preceding stage thereof, a structure including a constant current circuit 115, transistors 116 and 117, and resistors 118 and 119 may be disposed, so as to adopt a multi-stage structure in which the input voltage Vp is applied to a gate of the transistor 116, and the input voltage Vm is applied to a gate of the transistor 117. In this way, it is possible to increase a total gain while the gain of each transistor is decreased so that a mirror capacitance is decreased. However, there is a problem that the number of elements is increased.

Note that JP-A-2009-156835 (particularly, FIG. 5) discloses a conventional example of an over current protection circuit using a differential circuit having a structure in which bipolar transistors are used, but this document does not suggest suppressing the characteristic variation by setting gate sizes of the MOSFETs as described above and the accompanying problem of response speeds.

In addition, another example of the conventional differential circuit is illustrated in FIG. 16.

The conventional differential circuit illustrated in FIG. 16 includes a transistor 126 and a transistor 127 as P-channel MOS field effect transistors (MOSFETs) forming a differential pair. Sources of the transistors 126 and 127 are connected to a constant current circuit 125. A transistor 128 as an N-channel MOSFET having short-circuited drain and gate and a transistor 129 as an N-channel MOSFET constitute a current mirror, and the drain of the transistor 128 is connected to a drain of the transistor 126.

In addition, a transistor 130 as an N-channel MOSFET having short-circuited drain and gate and a transistor 131 as an N-channel MOSFET constitute a current mirror, and the drain of the transistor 130 is connected to a drain of the transistor 127. A transistor 132 as a P-channel MOSFET having short-circuited gate and drain and a transistor 133 as a P-channel MOSFET constitute a current mirror, and the drain of the transistor 132 is connected to a drain of the transistor 131. The output terminal Tout from which a current is output is connected to a connection node between a drain of the transistor 133 and a drain of the transistor 129.

In addition, a series circuit including a constant current circuit 123, a variable resistor VR1, and a transistor 121 as a P-channel MOSFET is disposed in association with the transistor 126. A gate of the transistor 126 is connected to a connection node between the constant current circuit 123 and the variable resistor VR1. Similarly, a series circuit including a constant current circuit 124, a variable resistor VR2, and a transistor 122 as a P-channel MOSFET is disposed in association with the transistor 127. A gate of the transistor 127 is connected to a connection node between the constant current circuit 124 and the variable resistor VR2.

Essentially, if the same input voltage is applied to the gates of the transistors 126 and 127 forming the differential pair, a drain current I121 flowing in the transistor 129 and a drain current I122 flowing in the transistor 133 are balanced due to the structure of the current mirrors described above, and no current is output from the output terminal Tout. Actually, however, a balance between the drain current I121 and the drain current I122 may be lost due to manufacturing variations of the transistors 126 and 127, and a current may be output from the output terminal Tout. In other words, an offset may occur. Note that the current flows out from the output terminal Tout or flows in from the outside depending on the balance between the drain current I121 and the drain current I122.

Accordingly, in the differential circuit illustrated in FIG. 16, the above-mentioned series circuits are disposed with respect to the transistors 126 and 127, and resistance values of the variable resistors VR1 and VR2 are adjusted in the state where the same input voltage is applied to gates of the transistors 121 and 122. Thus, gate voltages of the transistors 126 and 127 are adjusted so that the balance between the drain current I121 and the drain current I122 is adjusted, and hence current output from the output terminal Tout is prevented (namely, the offset does not occur). This offset adjustment is performed when shipping from a factory or in other occasion.

Note that an example of a conventional technique related to the above description is disclosed in JP-A-2013-030830.

However, the above-mentioned differential circuit illustrated in FIG. 16 requires power supply voltage considering two-stage voltage including a gate-source voltage of the transistor 121 and a gate-source voltage of the transistor 126 with respect to the input voltage of the transistor 121 (the same is true for the transistor 122), which is not desired in a recent situation where a lower power supply voltage for devices has been proceeding.

SUMMARY OF THE INVENTION

In view of the situation described above, it is a first object of the present invention to provide a differential circuit capable of suppressing the offset, a decrease of the response speed, and the number of elements.

In addition, in view of the situation described above, it is a second object of the present invention to provide a differential circuit capable of achieving a lower power supply voltage and adjusting the offset.

A differential circuit according to a first aspect of the present invention includes:

a first constant current circuit;

a second constant current circuit having the same constant current value as the first constant current circuit;

a current mirror including a first transistor having a current sink terminal connected to the first constant current circuit, a current drain terminal to which a first input voltage is applied, and a gate short-circuited to the current sink terminal, and a second transistor having a gate connected to the current sink terminal of the first transistor and a current drain terminal to which a second input voltage is applied; and a current output terminal connected to a connection node between the second constant current circuit and a part in which a current based on an output current of the current mirror flows.

A differential circuit according to a second aspect of the present invention includes:

a first transistor having a control terminal to which a first input voltage is applied;

a second transistor having a control terminal to which a second input voltage is applied;

a first constant current circuit disposed between an application terminal of a power supply voltage and current sink terminals of the first transistor and the second transistor;

an adjusting portion including a third transistor having a control terminal to which a third input voltage is applied, a fourth transistor having a control terminal to which a fourth input voltage is applied, and a second constant current circuit disposed between the application terminal of the power supply voltage and current sink terminals of the third transistor and the fourth transistor; and an output terminal from which a current is output, wherein the adjusting portion generates a third current in accordance with the third input voltage and generates a fourth current in accordance with the fourth input voltage, with respect to a first current generated in accordance with the first input voltage and a second current generated in accordance with the second input voltage, so as to adjust the current output from the output terminal.

A differential circuit according to a third aspect of the present invention includes:

a first current mirror portion including a first transistor having a current drain terminal connected to a first input voltage and a second transistor having a current drain terminal connected to a second input voltage;

a first constant current circuit disposed between a current sink terminal of the first transistor and an application terminal of a power supply voltage;

an adjusting portion equipped with a second current mirror portion including a third transistor having a current drain terminal connected to a third input voltage and a fourth transistor having a current drain terminal connected to a fourth input voltage, and a second constant current circuit disposed between a current sink terminal of the third transistor and the application terminal of the power supply voltage; and an output terminal from which a current is output, wherein the adjusting portion generates a current flowing in the fourth transistor in accordance with the third input voltage and the fourth input voltage with respect to a current flowing in the second transistor in accordance with the first input voltage and the second input voltage, so as to adjust the current output from the output terminal.

DETAILED DESCRIPTION OF THE PREFERRED EMBODIMENTS

Now, an embodiment of the present invention is described with reference to the drawings.

First Embodiment

Figure 1:
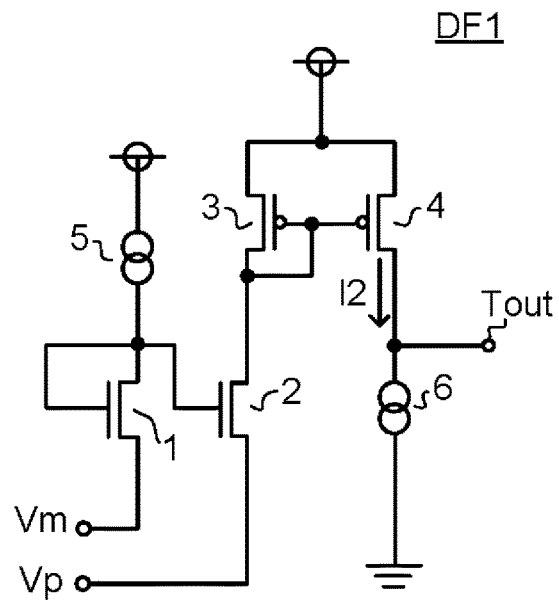
FIG. 1 is a circuit diagram of a differential circuit according to a first embodiment of the present invention.

A circuit diagram of a differential circuit according to a first embodiment of the present invention is illustrated in FIG. 1.

A differential circuit DF1 illustrated in FIG. 1 includes transistors 1 to 4 and constant current circuits 5 and 6. The transistor 1 as an N-channel MOSFET having short-circuited drain and gate and the transistor 2 as an N-channel MOSFET constitute a first current mirror. The drain of the transistor 1 is connected to an application terminal of a power supply voltage via the constant current circuit 5. An input voltage Vm is applied to a source of the transistor 1.

An input voltage Vp is applied to a source of the transistor 2. The transistor 3 as a P-channel MOSFET having short-circuited drain and gate and the transistor 4 as a P-channel MOSFET constitute a second current mirror. The drain of the transistor 3 is connected to a drain of the transistor 2. Sources of the transistors 3 and 4 are connected to the application terminal of the power supply voltage. Further, a drain of the transistor 4 is connected to a ground terminal via the constant current circuit 6. A connection node between the drain of the transistor 4 and the constant current circuit 6 is connected to an output terminal Tout.

Ideally, if the input voltage Vm is the same as the input voltage Vp so that a balance is maintained, the same current as the constant current flowing in the transistor 1 by the constant current circuit 5 flows in the transistor 2. In accordance with the flowing current as an input, an output current I2 flows by the second current mirror. The constant currents flowing in the constant current circuits 5 and 6 are set to be the same value, and hence the output current I2 is balanced with the current flowing in the constant current circuit 6 so that no current is output from the output terminal Tout. Further, if the balance between the input voltages Vp and Vm is lost, a current different from the constant current of the constant current circuit 5 flows in the transistor 2. As a result, the balance between the output current I2 and the current flowing in the constant current circuit 6 is lost, and hence current is output from the output terminal Tout.

However, in reality, due to characteristic variations of the transistors 1 and 2, even if the balance between the input voltages Vm and Vp is maintained, the balance between the output current I2 and the current flowing in the constant current circuit 6 may be lost so that a current is output from the output terminal Tout. In other words, an offset may occur.

For this reason, gate widths of the transistors 1 and 2 are increased, and/or gate lengths thereof are decreased, so that a gain is increased. Thus, the offset can be suppressed by suppressing the characteristic variations. In addition, even if the gain is increased so that a mirror capacitance is increased in this way, because the input voltage Vp is applied not to the gate but to the source of the transistor 2 in this embodiment, a variation of the input voltage Vp is promptly converted into a variation of the drain current. Thus, a decrease of response speed is not caused (the same is true for a variation of the input voltage Vm). In addition, it is also possible to suppress the number of elements constituting the differential circuit DF1.

Figure 2:
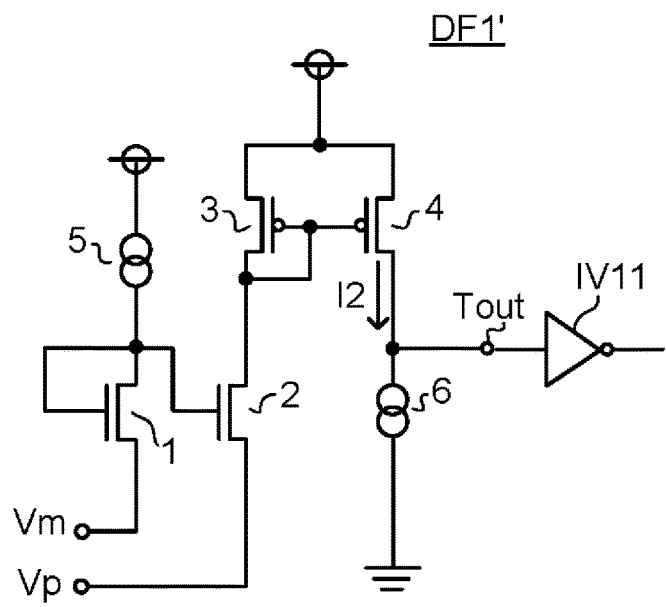
FIG. 2 is a diagram illustrating a variation of the differential circuit according to the first embodiment of the present invention.

In addition, as a differential circuit DF1' illustrated in FIG. 2, an inverter stage IV11 including at least one inverter may be disposed in the following stage of the output terminal Tout. With this structure, the differential circuit DF1' can function as a comparator.

<Example of Application to Power Supply Device>

Next, a power supply device is exemplified and described as a preferred application example of the differential circuit according to the first embodiment.

<<Switching Power Supply Device>>

Figure 3:
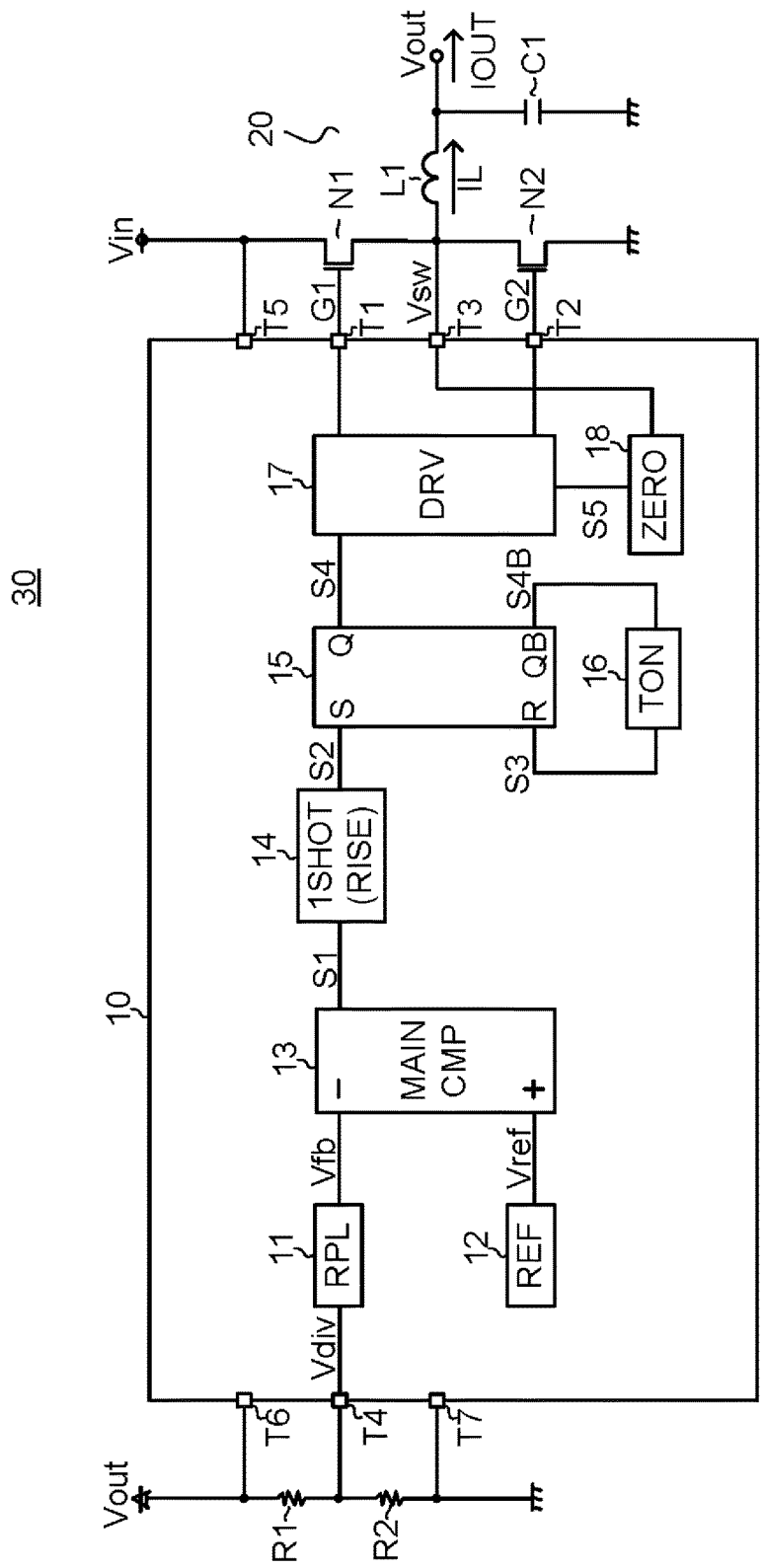
FIG. 3 is a block diagram illustrating an overall structure of a switching power supply device according to an embodiment of the present invention.

FIG. 3 is a block diagram illustrating an overall structure of a switching power supply device. A switching power supply device 30 of this structural example is a step-down type DC/DC converter that generates an output voltage Vout from an input voltage Vin by a nonlinear control method (a bottom detection fixed on-time method). The switching power supply device 30 includes a semiconductor device 10 and a switching output stage 20 constituted of various discrete components (N-channel MOS field effect transistors N1 and N2, a coil L1, a capacitor C1, and resistors R1 and R2) connected externally to the semiconductor device 10.

The semiconductor device 10 is a control unit (so-called power supply control IC) that performs overall control of the entire operation of the switching power supply device 30. The semiconductor device 10 has external terminals T1 to T7 (an upper gate terminal T1, a lower gate terminal T2, a switch terminal T3, a feedback terminal T4, an input voltage terminal T5, an output voltage terminal T6, and a ground terminal T7) as means to make electrical connections with the outside of the device.

The external terminal T1 is connected to a gate of the transistor N1. The external terminal T2 is connected to a gate of the transistor N2. The external terminal T3 is connected to an application terminal of a switched voltage Vsw (a connection node between a source of the transistor N1 and a drain of the transistor N2). The external terminal T4 is connected to an application terminal of a divided voltage Vdiv (a connection node between the resistor R1 and the resistor R2). The external terminal T5 is connected to an application terminal of the input voltage Vin. The external terminal T6 is connected to an application terminal of the output voltage Vout. The external terminal T7 is connected to the ground terminal.

Next, connection relationship of the discrete components that are externally connected to the semiconductor device 10 is described. A drain of the transistor N1 is connected to the application terminal of the input voltage Vin. A source of the transistor N2 is connected to the ground terminal. The source of the transistor N1 and the drain of the transistor N2 are both connected to a first terminal of the coil L1. A second terminal of the coil L1 and a first terminal of the capacitor C1 are both connected to the application terminal of the output voltage Vout. A second terminal of the capacitor C1 is connected to the ground terminal. The resistor R1 and the resistor R2 are connected in series between the application terminal of the output voltage Vout and the ground terminal.

The transistor N1 is an output transistor that is turned on and off in accordance with a gate signal G1 input from the external terminal T1. The transistor N2 is a synchronous rectification transistor that is turned on and off in accordance with a gate signal G2 input from the external terminal T2. Note that a diode may be used as a rectifier element instead of the transistor N2. In addition, the transistors N1 and N2 may be incorporated in the semiconductor device 10. The coil L1 and the capacitor C1 function as a rectifying and smoothing portion that rectifies and smoothes the switched voltage Vsw having a rectangular waveform at the external terminal T3 so as to generate the output voltage Vout. The resistors R1 and R2 function as a divided voltage generating portion that divides the output voltage Vout so as to generate the divided voltage Vdiv.

Next, an internal structure of the semiconductor device 10 is described. The semiconductor device 10 includes a ripple injection circuit 11, a reference voltage generating circuit 12, a main comparator 13, a one-shot pulse generating circuit 14, an RS flip-flop 15, an on-time setting circuit 16, a gate driver circuit 17, and a reverse current detection circuit 18, which are integrated.

The ripple injection circuit 11 adds a ripple voltage Vrp1 (pseudo-ripple component that simulates a coil current IL flowing in the coil L1) to the divided voltage Vdiv so as to generate a feedback voltage Vfb (=Vdiv+Vrp1). By introducing this ripple injection technique, it is possible to perform stable switching control even if a ripple component of the output voltage Vout (therefore, the divided voltage Vdiv) is not so high, and hence it is possible to use a laminated ceramic capacitor or the like having a small ESR as the capacitor C1. However, if the ripple component of the output voltage Vout is sufficiently large, the ripple injection circuit 11 can be eliminated.

The reference voltage generating circuit 12 generate a predetermined reference voltage Vref.

The main comparator 13 compares the feedback voltage Vfb input to an inverting input terminal (−) with the reference voltage Vref input to a noninverting input terminal (+) so as to generate a comparison signal S1. The comparison signal S1 becomes a low level when the feedback voltage Vfb is higher than the reference voltage Vref while it becomes a high level when the feedback voltage Vfb is lower than the reference voltage Vref.

The one-shot pulse generating circuit 14 generates a one-shot pulse in a set signal S2 by a trigger of a rising edge of the comparison signal S1.

The RS flip-flop 15 sets an output signal S4 to the high level at a rising edge of the set signal S2 input to a set terminal (S) and resets the output signal S4 to the low level at a rising edge of a reset signal S3 input to a reset terminal (R).

The on-time setting circuit 16 generates a one-shot pulse in the reset signal S3 after a predetermined on-time Ton has elapsed from when an inverted output signal S4B of the RS flip-flop 15 (a logical inversion signal of the output signal S4) is switched to the low level.

The gate driver circuit 17 generates the gate signals G1 and G2 in accordance with the output signal S4 of the RS flip-flop 15, so as to complementarily switch the transistors N1 and N2. Note that in this specification, meaning of the term "complementarily" includes not only a case where on and off of the transistors N1 and N2 are completely reversed but also a case where a delay time is set to the on/off transition timing of the transistors N1 and N2 (a case where a both off period (dead time) is set) in view of preventing a penetration current.

The reverse current detection circuit 18 monitors a reverse current of the coil current IL (that flows from the coil L1 to the ground terminal via the transistor N2) and generates a reverse current detection signal S5. The reverse current detection signal S5 is latched to the high level (that is a logical level when the reverse current is detected) at a time point when the reverse current of the coil current IL is detected, and is reset to the low level (that is a logical level when the reverse current is not detected) at a rising edge of the gate signal G1 in the next period. Further, as a method of monitoring the reverse current of the coil current IL, it is performed to detect a zero cross point at which the switched voltage Vsw is switched from negative to positive in an on period of the transistor N2, for example. The gate driver circuit 17 generates the gate signal G2 so as to forcibly turn off the transistor N2 without depending on the output signal S4 if the reverse current detection signal S5 is the high level.

Further, the ripple injection circuit 11, the reference voltage generating circuit 12, the main comparator 13, the one-shot pulse generating circuit 14, the RS flip-flop 15, the on-time setting circuit 16, the gate driver circuit 17, and the reverse current detection circuit 18 function as a switching control circuit in the nonlinear control method (the bottom detection fixed on-time method in this structural example), in which the output voltage Vout is generated from the input voltage Vin by controlling on and off of the transistors N1 and N2 in accordance with a result of the comparison between the feedback voltage Vfb and the reference voltage Vref.

<<Switching Operation>>

Figure 4:
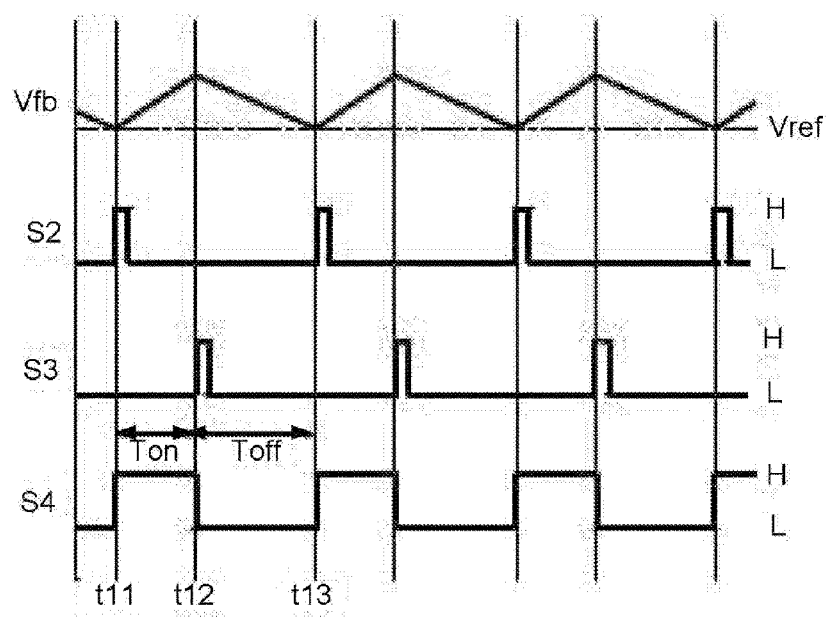
FIG. 4 is a timing chart showing a switching operation in a heavy load.

FIG. 4 is a timing chart illustrating a switching operation in a heavy load (in a current continuous mode), in which the feedback voltage Vfb, the set signal S2, the reset signal S3, and the output signal S4 are shown in order from the upper side.

When the feedback voltage Vfb is lowered to the reference voltage Vref at time point t11, the set signal S2 is raised to the high level, and the output signal S4 is switched to the high level. As a result, the transistor N1 becomes turned on so that the feedback voltage Vfb starts to rise.

After that, when the reset signal S3 is raised to the high level at time point t12 after the on-time Ton elapses, the output signal S4 is switched to the low level. As a result, the transistor N1 becomes turned off so that the feedback voltage Vfb starts to decrease again.

The gate driver circuit 17 generates the gate signals G1 and G2 in accordance with the output signal S4 and uses the same so as to control on and off of the transistors N1 and N2. Specifically, when the output signal S4 is the high level, basically, the gate signal G1 is the high level so that the transistor N1 is turned on while the gate signal G2 is the low level so that the transistor N2 is turned off. On the contrary, when the output signal S4 is the low level, basically, the gate signal G1 is the low level so that the transistor N1 is turned off while the gate signal G2 is the high level so that the transistor N2 is turned on.

By the on/off control of the transistors N1 and N2, the switched voltage Vsw having a rectangular waveform appears at the external terminal T3. The switched voltage Vsw is rectified and smoothed by the coil L1 and the capacitor C1 so that the output voltage Vout is generated.

Note that the output voltage Vout is divided by the resistors R1 and R2 so that the divided voltage Vdiv (therefore, the feedback voltage Vfb) is generated. By this output feedback control, a switching power supply device 25 can generate the desired output voltage Vout from the input voltage Vin with quite a simple structure.

<<Reverse Current Breaking Operation>>

Figure 5:
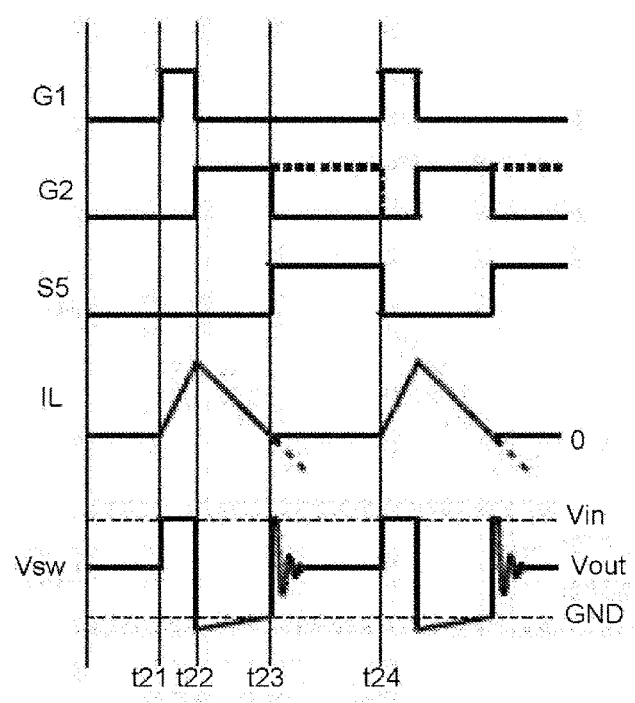
FIG. 5 is a timing chart showing a reverse current breaking operation in a light load.

FIG. 5 is a timing chart illustrating a reverse current breaking operation in a light load (in a current discontinuous mode), in which the gate signals G1 and G2, the reverse current detection signal S5, the coil current IL, and the switched voltage Vsw are shown in order from the upper side.

Between time points t21 and t22, the gate signal G1 is the high level while the gate signal G2 is the low level. Accordingly, the transistor N1 is turned on while the transistor N2 is turned off. As a result, between the time points t21 to t22, the switched voltage Vsw is raised to substantially the input voltage Vin so that the coil current IL is being increased.

When the gate signal G1 is lowered to the low level while the gate signal G2 is raised to the high level at the time point t22, the transistor N1 becomes turned off, and the transistor N2 becomes turned on. As a result, the switched voltage Vsw is lowered to a negative voltage (=GND-IL×RN2, where RN2 represents an on resistance value of the transistor N2), and the coil current IL starts to decrease.

Here, if an output current Iout flowing to a load is sufficiently large in the heavy load, because energy stored in the coil L1 is large, the coil current IL continues to flow to the load without becoming lower than zero until time point t24 when the gate signal G1 is raised to the high level again, and hence the switched voltage Vsw is maintained at negative. On the contrary, if the output current Tout flowing to the load is small in the light load, because energy stored in the coil L1 is small, the coil current IL becomes lower than zero at time point t23. Thus, the reverse current of the coil current IL occurs, and a polarity of the switched voltage Vsw is switched from negative to positive. In this state, the charge stored in the capacitor C1 is discharged to the ground terminal, and hence efficiency in the light load is lowered.

Accordingly, the switching power supply device 30 has a structure in which the reverse current detection circuit 18 is used for detecting the reverse current of the coil current IL (polarity inversion of the switched voltage Vsw), and the transistor N2 is forcibly turned off in the high level period of the reverse current detection signal S5 (between the time points t23 and t24). With this structure, the reverse current of the coil current IL can promptly be cut off, and hence it is possible to cancel efficiency degradation in a light load.

The differential circuit according to the first embodiment can be applied to the reverse current detection circuit 18. For instance, in the differential circuit DF1' as a comparator (FIG. 2), the application terminal of the input voltage Vm is connected to the ground terminal, and the switched voltage Vsw is applied to the application terminal of the input voltage Vp. Further, in an example in which a normal current detecting resistor is connected to the application terminal of the input voltage Vp, for example, the current flowing in the transistor 2 is added as a bias current to a current flowing in the resistor. However, even if a current flows in the transistor 2, the reverse current detection circuit 18 does not affect the current flowing in the transistor N2.

Second Embodiment

Figure 6:
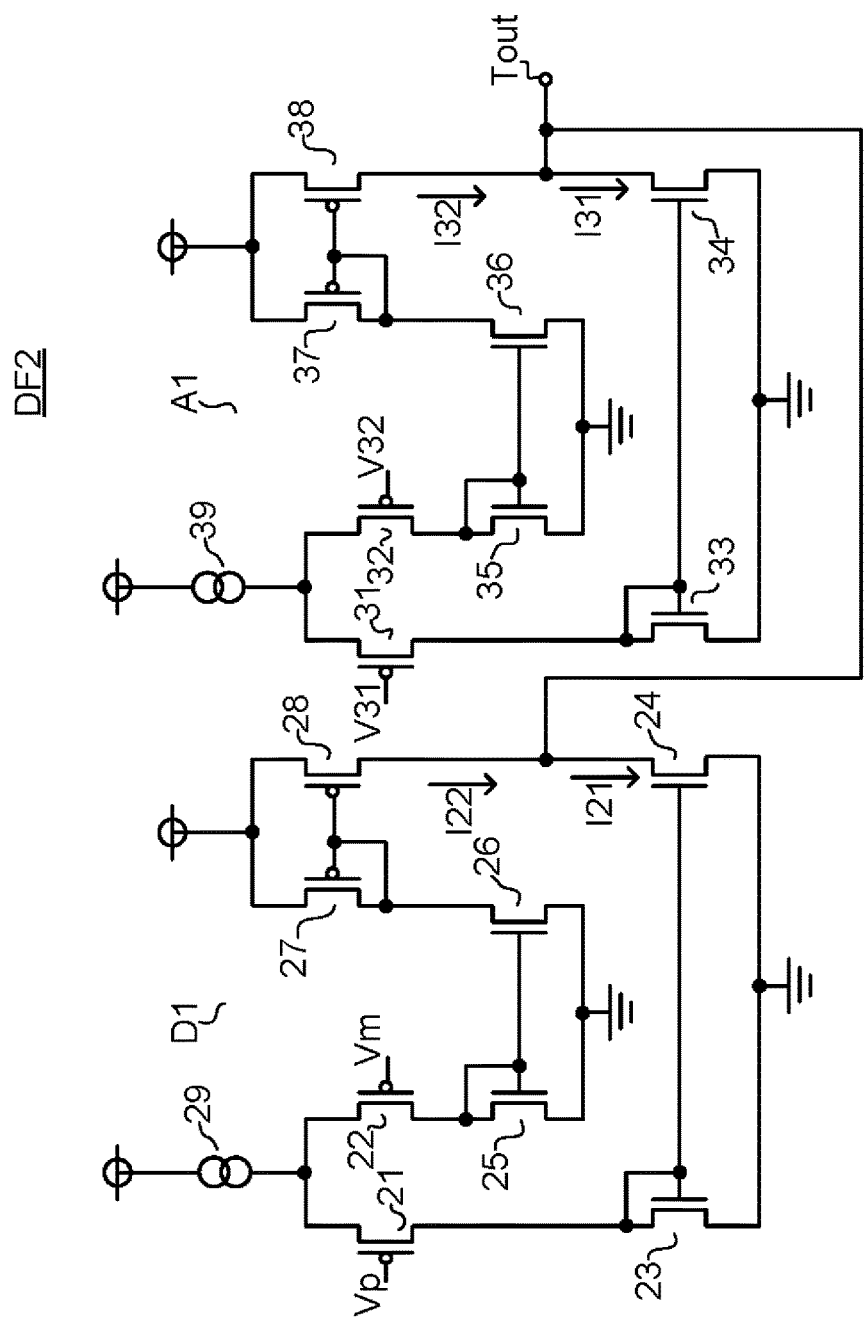
FIG. 6 is a circuit diagram of a differential circuit according to a second embodiment of the present invention.

FIG. 6 illustrates a circuit diagram of a differential circuit according to a second embodiment of the present invention.

A differential circuit DF2 according to the second embodiment illustrated in FIG. 6 includes a differential main body portion D1 and an adjusting portion A1.

The differential main body portion D1 is constituted of transistors 21 to 28 and a constant current circuit 29. Sources of the transistors 21 and 22 as P-channel MOSFETs forming a differential pair are connected to an application terminal of the power supply voltage via the constant current source 29. The input voltage Vp is applied to a gate of the transistor 21, and an input voltage Vm is applied to a gate of the transistor 22.

The transistor 23 as an N-channel MOSFET having short-circuited drain and gate and the transistor 24 as an N-channel MOSFET constitute a first current mirror, and the drain of the transistor 23 is connected to a drain of the transistor 21. Sources of the transistors 23 and 24 are connected to the ground terminal.

The transistor 25 as an N-channel MOSFET having short-circuited drain and gate and the transistor 26 as an N-channel MOSFET constitute a second current mirror, and the drain of the transistor 22 is connected to a drain of the transistor 25. Sources of the transistors 25 and 26 are connected to the ground terminal.

The transistor 27 as a P-channel MOSFET having short-circuited drain and gate and the transistor 28 as a P-channel MOSFET constitute a third current mirror, the drain of the transistor 27 is connected to a drain of the transistor 26, and the drain of the transistor 28 is connected to a drain of the transistor 24. Sources of the transistors 27 and 28 are connected to the application terminal of the power supply voltage.

The adjusting portion A1 includes transistors 31 to 38 and a constant current circuit 39. The structure of the adjusting portion A1 is the same as the structure of the differential main body portion D1, and hence detailed description of the structure is omitted. Further, the transistors 33 and 34 constitute a fourth current mirror, the transistors 35 and 36 constitute a fifth current mirror, and the transistors 37 and 38 constitute a sixth current mirror.

Further, a connection node between the drain of the transistor 28 and the drain of the transistor 24 in the differential main body portion D1, and a connection node between a drain of the transistor 38 and a drain of the transistor 34 in the adjusting portion A1 are commonly connected to the output terminal Tout.

Drain currents flow in the transistors 21 and 22 at a ratio corresponding to the input voltages Vp and Vm. Further, an output current I21 flows by the first current mirror in accordance with an input of the drain current flowing in the transistor 21. In addition, an output current I22 flows by the second current mirror and the third current mirror in accordance with an input of the drain current flowing in the transistor 22.

Essentially, if the input voltage Vp is the same as the input voltage Vm, the output current I21 and the output current I22 are balanced, and no current is output from the output terminal Tout. Actually, however, a balance between the output current I21 and the output current I22 may be lost due to manufacturing variations of the transistors 21 and 22 forming the differential pair. In other words, a current may be output from the output terminal Tout so that an offset may occur.

Accordingly, in this embodiment, the adjusting portion A1 is disposed so as to adjust the offset. Drain currents flow in the transistors 31 and 32 at a ratio corresponding to an input voltage V31 applied to a gate of the transistor 31 and an input voltage V32 applied to a gate of the transistor 32.

Further, an output current I31 flows by the fourth current mirror in accordance with an input of the drain current flowing in the transistor 31. In addition, an output current I32 flows by the fifth current mirror and the sixth current mirror in accordance with an input of the drain current flowing in the transistor 32.

When adjusting the offset, in a state where the input voltages Vp and Vm are applied as the same voltage, the current output from the output terminal Tout is monitored, and the input voltages V31 and V32 are adjusted, so that no current is output from the output terminal Tout. For instance, if the output current I21 is larger than the output current I22, the output current I32 is set larger than the output current I31 so that no current is output from the output terminal Tout. This adjustment is performed when shipping from a factory, for example.

Note that the adjustment of the offset includes not only the adjustment for preventing occurrence of the offset but also adjustment for generating a desired offset. In other words, it is possible to adjust so that a desired current is output from the output terminal Tout in the state where the input voltages Vp and Vm are applied as the same voltage.

According to this embodiment, it is sufficient to supply the power supply voltage considering only one stage voltage of gate-source voltages of the transistors 21 and 22 with respect to the input voltages Vp and Vm, and to supply the power supply voltage considering only one stage voltage of gate-source voltages of the transistors 31 and 32 with respect to the input voltages V31 and V32. Accordingly, it is possible to achieve a lower voltage of the power supply voltage.

In addition, in this embodiment, the differential main body portion D1 and the adjusting portion A1 can have the same structure, and hence it is easy to manufacture the differential circuit DF2.

Figure 7:
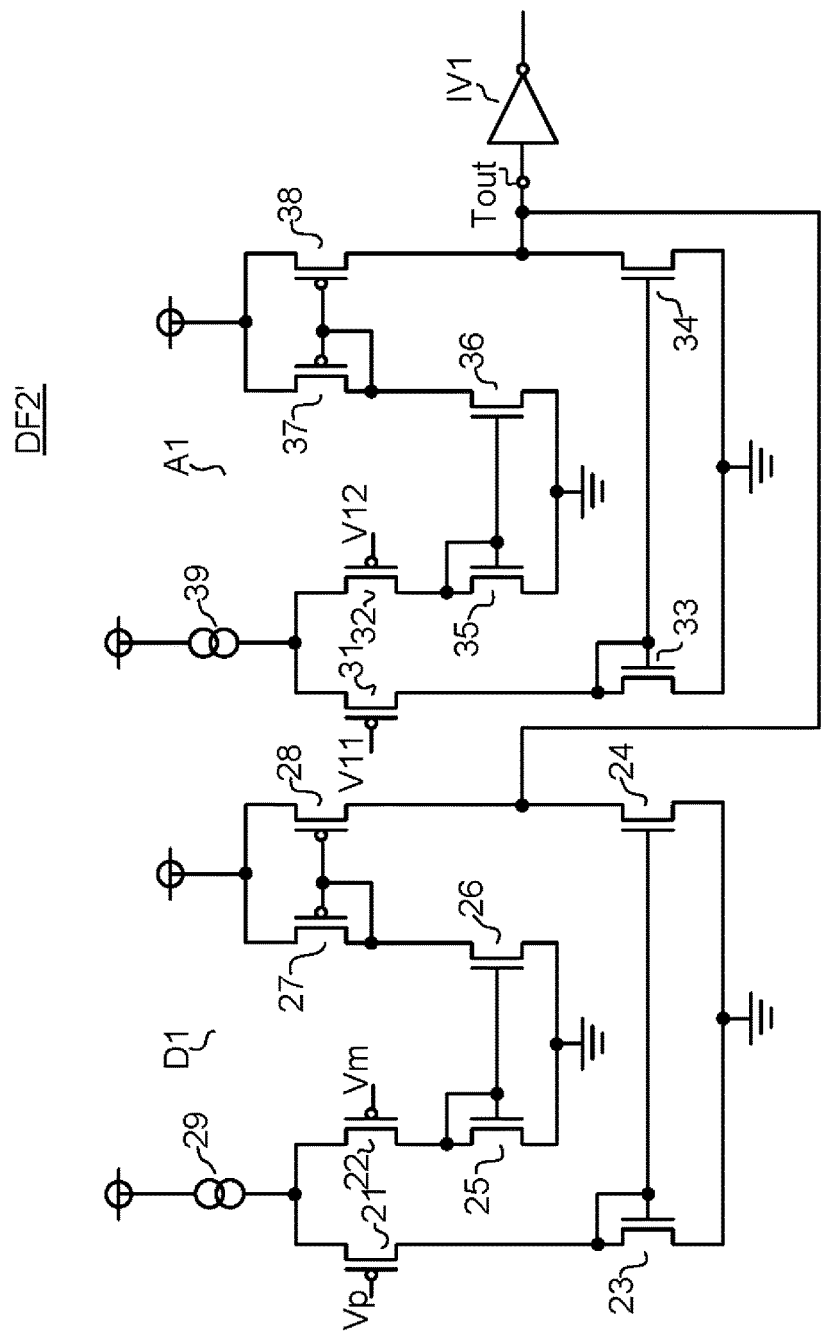
FIG. 7 is a diagram illustrating a variation of the differential circuit according to the second embodiment of the present invention.

Here, FIG. 7 illustrates a variation of the differential circuit according to this embodiment. A differential circuit DF2' illustrated in FIG. 7 includes an inverter stage IV1 (including at least one inverter) having an input terminal connected to the output terminal Tout, in addition to the structure of the differential main body portion D1 and the adjusting portion A1 illustrated in FIG. 6. In this way, the differential circuit DF2' can operate as a comparator. Further, also in the embodiments described below, the differential circuit can be used as a comparator in the same manner by disposing an inverter stage in the following stage of the output terminal Tout.

Third Embodiment

Next, a third embodiment of the present invention is described. A circuit diagram of a differential circuit of this embodiment is illustrated in FIG. 8.

Figure 8:
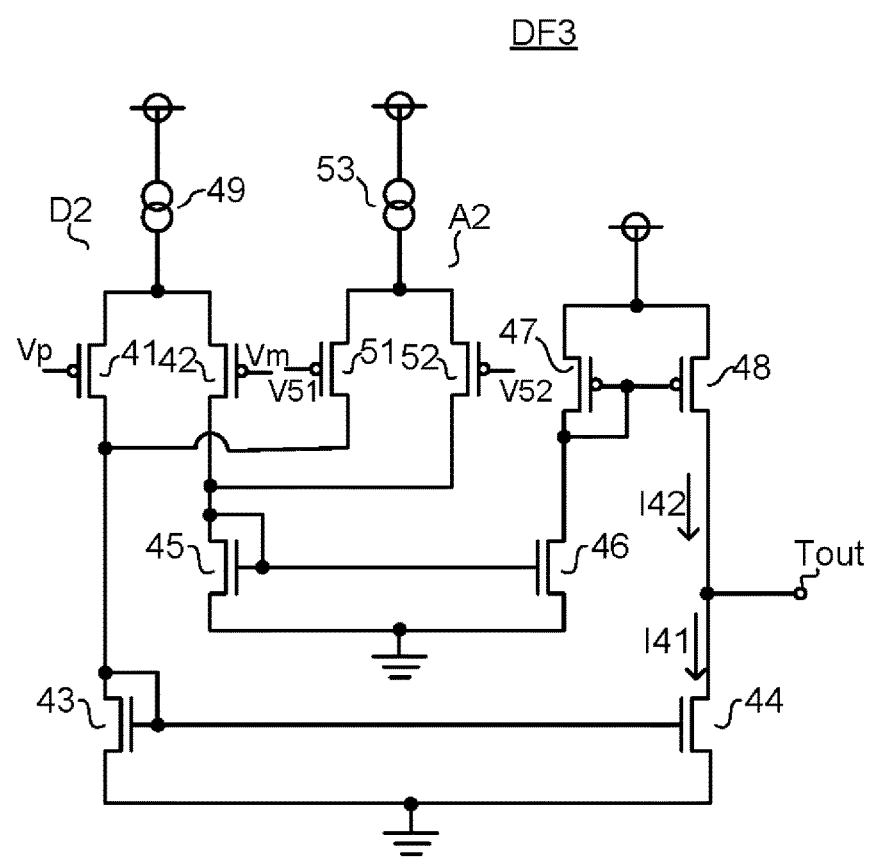
FIG. 8 is a circuit diagram of a differential circuit according to a third embodiment of the present invention.

A differential circuit DF3 according to the third embodiment illustrated in FIG. 8 includes a differential main body portion D2 and an adjusting portion A2. The differential main body portion D2 includes transistors 41 to 48 and a constant current circuit 49, having the same structure as the differential main body portion D1 in the second embodiment, and hence detailed description thereof is omitted.

In addition, the adjusting portion A2 includes a transistor 51 as a P-channel MOSFET having a gate to which an input voltage V51 is applied, a transistor 52 as a P-channel MOSFET having a gate to which an input voltage V52 is applied, and a constant current circuit 53. Sources of the transistors 51 and 52 are connected to the application terminal of the power supply voltage via the constant current circuit 53. A drain of the transistor 51 is connected to a connection node between a drain of the transistor 41 and a drain of the transistor 43. A drain of the transistor 52 is connected to a connection node between a drain of the transistor 42 and a drain of the transistor 45.

Drain currents flow in the transistors 41 and 42 at a ratio corresponding to the input voltages Vp and Vm. In addition, drain currents flow in the transistors 51 and 52 at a ratio corresponding to the input voltages V51 and V52. The drain current flowing in the transistor 41 and the drain current flowing in the transistor 51 are combined, and an output current I41 flows by the first current mirror (constituted of the transistors 43 and 44) in accordance with an input of the combined current. In addition, the drain current flowing in the transistor 42 and the drain current flowing in the transistor 52 are combined, and an output current I42 flows by the second current mirror (constituted of the transistors 45 and 56) and the third current mirror (constituted of the transistors 47 and 48) in accordance with an input of the combined current. The current output from the output terminal Tout is determined in accordance with a balance between the output currents I41 and I42.

In the case of the offset adjustment, in the state where the input voltages Vp and Vm are applied as the same voltage, the current output from the output terminal Tout is monitored, and the input voltages V51 and V52 to be applied are adjusted. Thus, even if there are manufacturing variations of the transistors 41 and 42 forming the differential pair, a desired offset adjustment can be performed.

In addition, it is sufficient to supply the power supply voltage considering only one stage voltage of gate-source voltages of the transistors 41 and 42 with respect to the input voltages Vp and Vm, and to supply the power supply voltage considering only one stage voltage of gate-source voltages of the transistors 51 and 52 with respect to the input voltages V51 and V52. Accordingly, it is possible to achieve a lower voltage of the power supply voltage.

In addition, in this embodiment, it is also possible to obtain the effect that the number of elements constituting the adjusting portion can be reduced.

Fourth Embodiment

Figure 9:
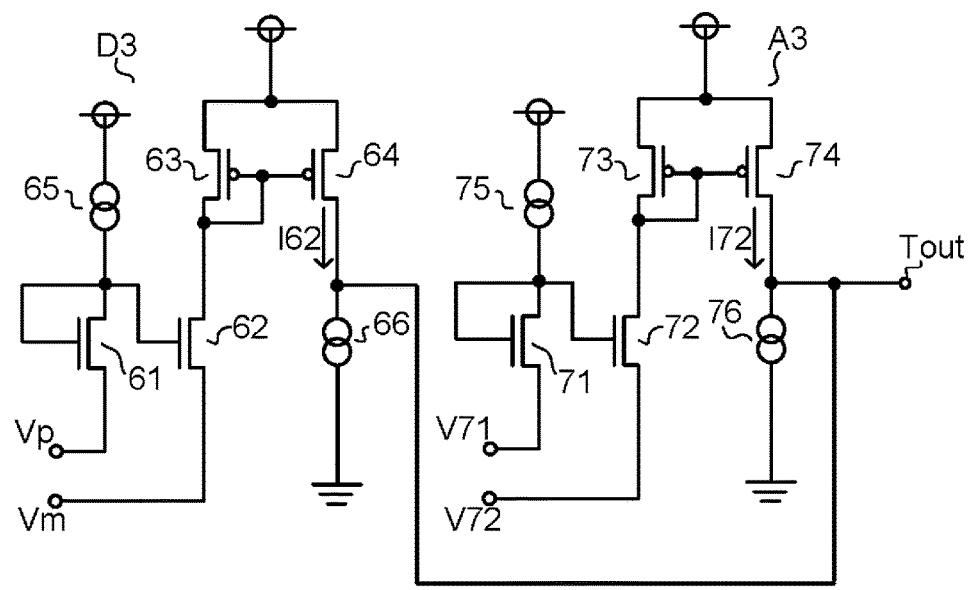
FIG. 9 is a circuit diagram of a differential circuit according to a fourth embodiment of the present invention.

Next, a fourth embodiment of the present invention is described. A circuit diagram of a differential circuit according to this embodiment is illustrated in FIG. 9. A differential circuit DF4 according to the fourth embodiment illustrated in FIG. 9 includes a differential main body portion D3 and an adjusting portion A3.

The differential main body portion D3 includes transistors 61 to 64 and constant current circuits 65 and 66. The transistor 61 as an N-channel MOSFET having short-circuited drain and gate and the transistor 62 as an N-channel MOSFET constitute the first current mirror. The drain of the transistor 61 is connected to an application terminal of the power supply voltage via the constant current circuit 65. The input voltage Vp is applied to a source of the transistor 61.

The input voltage Vm is applied to a source of the transistor 62. The transistor 63 as a P-channel MOSFET having short-circuited drain and gate and the transistor 64 as a P-channel MOSFET constitute the second current mirror. The drain of the transistor 63 is connected to a drain of the transistor 62. Sources of the transistors 63 and 64 are connected to the application terminal of the power supply voltage. Further, a drain of the transistor 64 is connected to the ground terminal via the constant current circuit 66.

In addition, the adjusting portion A3 includes transistors 71 to 74 and constant current circuits 75 and 76, having the same structure as the differential main body portion D3, and hence detailed description thereof is omitted. Further, an input voltage V71 is applied to a source of the transistor 71, and an input voltage V72 is applied to a source of the transistor 72.

A connection node between a drain of the transistor 74 and the constant current circuit 76 in the adjusting portion A3, and a connection node between a drain of the transistor 64 and the constant current circuit 66 in the differential main body portion D3 are commonly connected to the output terminal Tout.

Ideally, when the input voltages Vp and Vm are balanced as the same voltage, the same current as the constant current by the constant current circuit 65 flowing in the transistor 61 flows in the transistor 62. In accordance with an input of the flowing current, an output current I62 flows by the second current mirror. Because the constant currents flowing in the constant current circuits 65 and 66 are set to the same value, the output current I62 and the current flowing in the constant current circuit 66 are balanced so that no current is output from the output terminal Tout. Further, if the balance between the input voltages Vp and Vm is lost, a current different from the constant current of the constant current circuit 65 flows in the transistor 62. Thus, the balance between the output current I62 and the current flowing in the constant current circuit 66 is lost so that a current is output from the output terminal Tout.

However, in reality, due to manufacturing variations of the transistors 61 and 62, even if the input voltages Vp and Vm are balanced, the balance between the output current I62 and the current flowing in the constant current circuit 66 may be lost so that a current is output from the output terminal Tout. In other words, an offset may occur.

For this reason, in this embodiment, the adjusting portion A3 is disposed so as to adjust the offset. The constant currents flowing in the constant current circuits 75 and 76 in the adjusting portion A3 are set to have the same values as the constant current circuits 65 and 66. Further, by adjusting the input voltages V71 and V72, it is possible to adjust an output current I72 with respect to the current flowing in the constant current circuit 76. For instance, if the output current I62 is larger than the current flowing in the constant current circuit 66, the output current I72 is adjusted to be smaller than the current flowing in the constant current circuit 76 so that no current is output from the output terminal Tout. In other words, it is possible to prevent occurrence of an offset.

When adjusting the offset, in the state where the input voltages Vp and Vm are applied as the same voltage, the input voltages V71 and V72 are adjusted while monitoring the current output from the output terminal Tout.

According to this embodiment, it is sufficient to supply the power supply voltage considering only one stage voltage of gate-source voltages of the transistors 61 and 62 with respect to the input voltages Vp and Vm, and to supply the power supply voltage considering only one stage voltage of gate-source voltages of the transistors 71 and 72 with respect to the input voltages V71 and V72. Accordingly, it is possible to achieve a lower voltage of the power supply voltage.

In addition, in this embodiment, the differential main body portion D3 and the adjusting portion A3 can have the same structure, and hence it is easy to manufacture the differential circuit DF3.

<Application Example to Power Supply Device>

Figure 10:
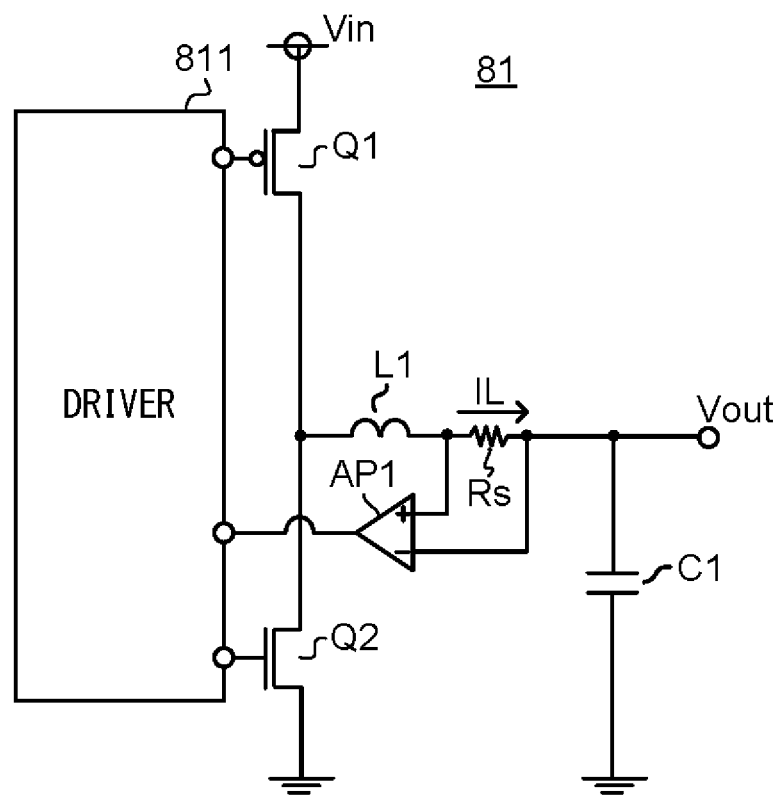
FIG. 10 is a diagram illustrating a structure of a power supply device according to an embodiment of the present invention.

As a preferred application object of the differential circuit according to the second to fourth embodiments described above, a power supply device is exemplified and described. FIG. 10 illustrates a structural example of the power supply device as an application object of the differential circuit. A power supply device 81 illustrated in FIG. 10 is a synchronous rectification type step-down DC/DC converter, which includes an output stage constituted of a transistor Q1, a transistor Q2, the inductor L1, the capacitor C1, and a sense resistor Rs; a voltage amplifier AP1; and a driver 811. The DC/DC converter generates and outputs an output voltage Vout from the input voltage Vin.

The transistor Q1 as a P-channel MOSFET and the transistor Q2 as an N-channel MOSFET are connected in series so as to form a bridge. More specifically, a source of the transistor Q1 is connected to the application terminal of the input voltage Vin, and a drain of the same is connected to a drain of the transistor Q2. A source of the transistor Q2 is connected to the ground terminal.

The inductor L1, the sense resistor Rs, and the capacitor C1 are connected in series between the ground terminal and a connection node between the drains of the transistors Q1 and Q2. The sense resistor Rs is a resistor for detecting the inductor current IL.

The driver 811 applies the gate signal to the transistors Q1 and Q2 so as to complementarily (exclusively) turn on and off the transistors Q1 and Q2 manner. Note that meaning of the term "complementarily (exclusively)" includes not only a case where on and off of the transistors Q1 and Q2 are completely reversed but also a case where a both off period of the transistors Q1 and Q2 is set in view of preventing a penetration current.

The voltage amplifier AP1 amplifies a voltage across the terminals of the sense resistor Rs generated by the inductor current IL and outputs the current detection signal as a voltage signal to the driver 811. This current detection signal is used for detecting overcurrent, for example.

Figure 11:
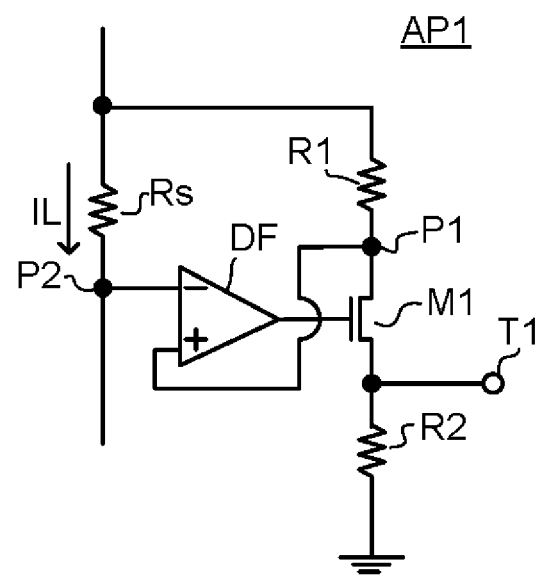
FIG. 11 is a diagram illustrating a structure of a voltage amplifier according to an embodiment of the present invention.

A circuit structure of the voltage amplifier AP1 is illustrated in FIG. 11. As illustrated in FIG. 11, the voltage amplifier AP1 includes a differential circuit DF, the resistor R1, the resistor R2, and a transistor M1. One of the differential circuits (DF2 to DF4) of the embodiments described above can be used as the differential circuit DF. The input voltage Vp in the embodiment described above is applied to the noninverting input terminal of the differential circuit DF, and the input voltage Vm is applied to the inverting input terminal.

One terminal of the sense resistor Rs in which the inductor current IL flows is connected to the inverting input terminal of the differential circuit DF. The other terminal of the sense resistor Rs is connected to a drain of the transistor M1 as an N-channel MOSFET via the resistor R1. A connection node between the resistor R1 and the drain of the transistor M1 is connected to the noninverting input terminal of the differential circuit DF. A source of the transistor M1 is connected to the ground terminal via the resistor R2. A connection node between the source of the transistor M1 and the resistor R2 is connected to the output terminal T1.

With this structure, the differential circuit DF outputs a current to a gate of the transistor M1 in accordance with a difference between a voltage input to the noninverting input terminal and a voltage input to the inverting input terminal, so as to control a potential at a connection node P1 between the resistor R1 and the transistor M1 to be equal to a potential at one terminal P2 of the sense resistor Rs. In this way, control is performed so that the voltage across the terminals of the sense resistor Rs becomes equal to a voltage across the terminals of the resistor R1.

Further, because the current flowing in the resistor R1 is the same as the current flowing in the resistor R2, if a resistance value of the resistor R2 is ten times of that of the resistor R1, a voltage across the terminals of the resistor R2 can be ten times of that of the resistor R1. Accordingly, it is possible to output a voltage obtained by amplifying a voltage generated across the sense resistor Rs by the inductor current IL from the output terminal T1.

It is preferred that the differential circuit DF used for the voltage amplifier AP1 should have a low offset, and hence it is preferred to use the differential circuit capable of adjusting the offset of each embodiment described above.

Figure 12:
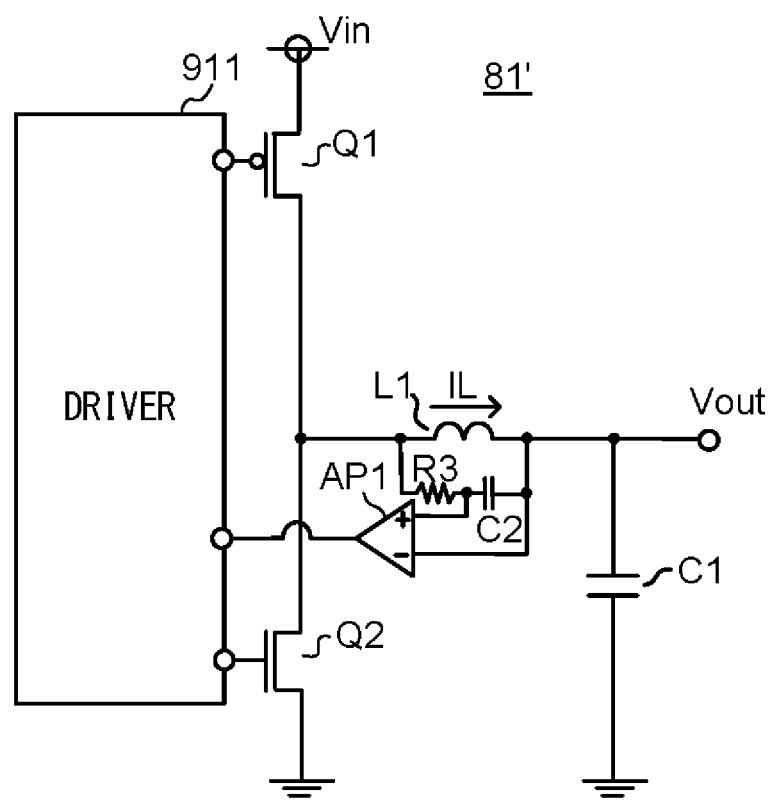
FIG. 12 is a diagram illustrating a structure of a power supply device according to an embodiment of the present invention.

In addition, FIG. 12 illustrates another example of the power supply device using the voltage amplifier AP1. In a power supply device 81' illustrated in FIG. 12 has a structure of using a DC resistance (DCR) of the inductor L1 as an element for detecting the inductor current IL. When adopting this structure, a resistor R3 and a capacitor C2 are connected in parallel to the inductor L1 as illustrated in FIG. 12, and a voltage generated across the terminals of the capacitor C2 is input to the voltage amplifier AP1.

<Example of Electronic Device>

Figure 13:
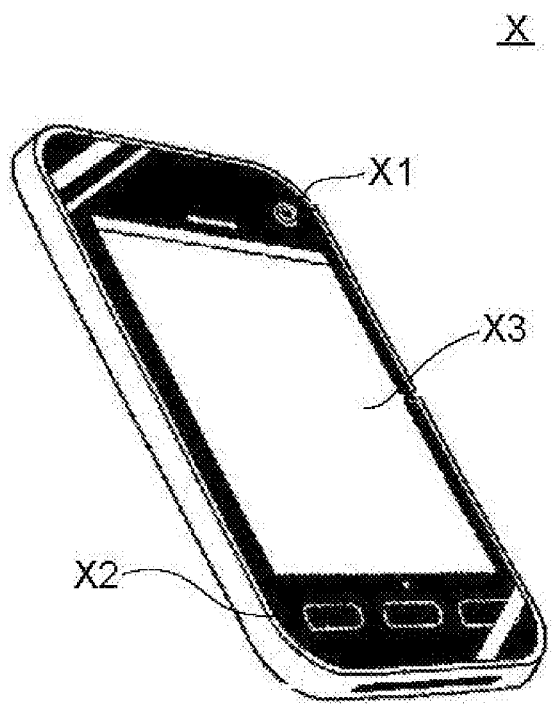
FIG. 13 is an external view of a smartphone according to an embodiment of the present invention.
Figure 14:
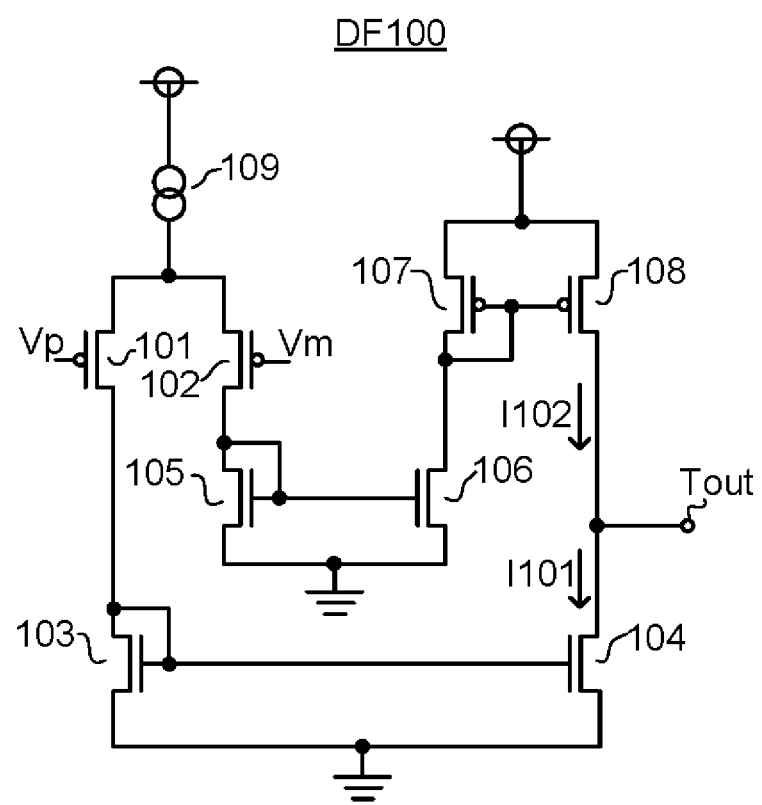
FIG. 14 is a circuit diagram of a differential circuit according to a conventional example.
Figure 15:
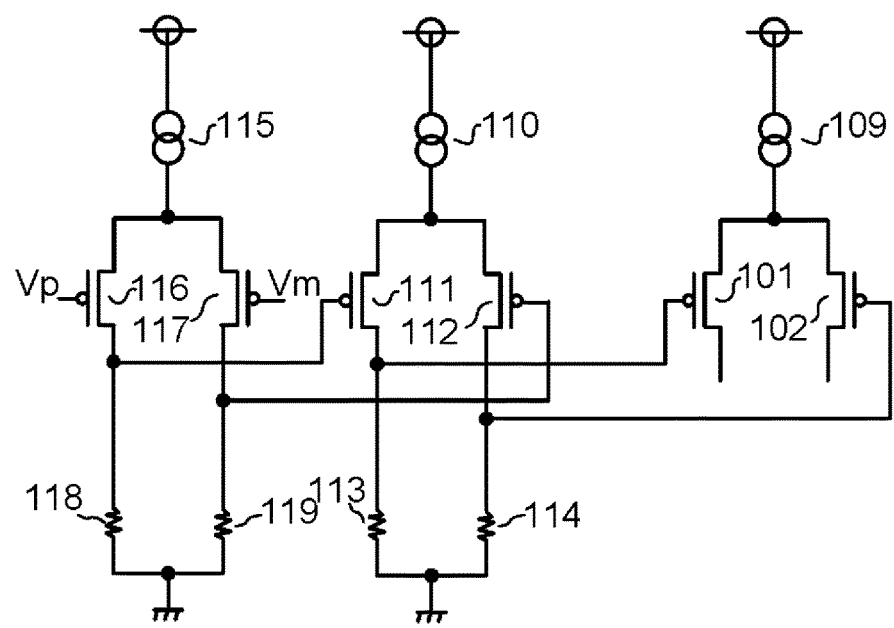
FIG. 15 is a diagram illustrating a variation of the differential circuit according to the conventional example.
Figure 16:
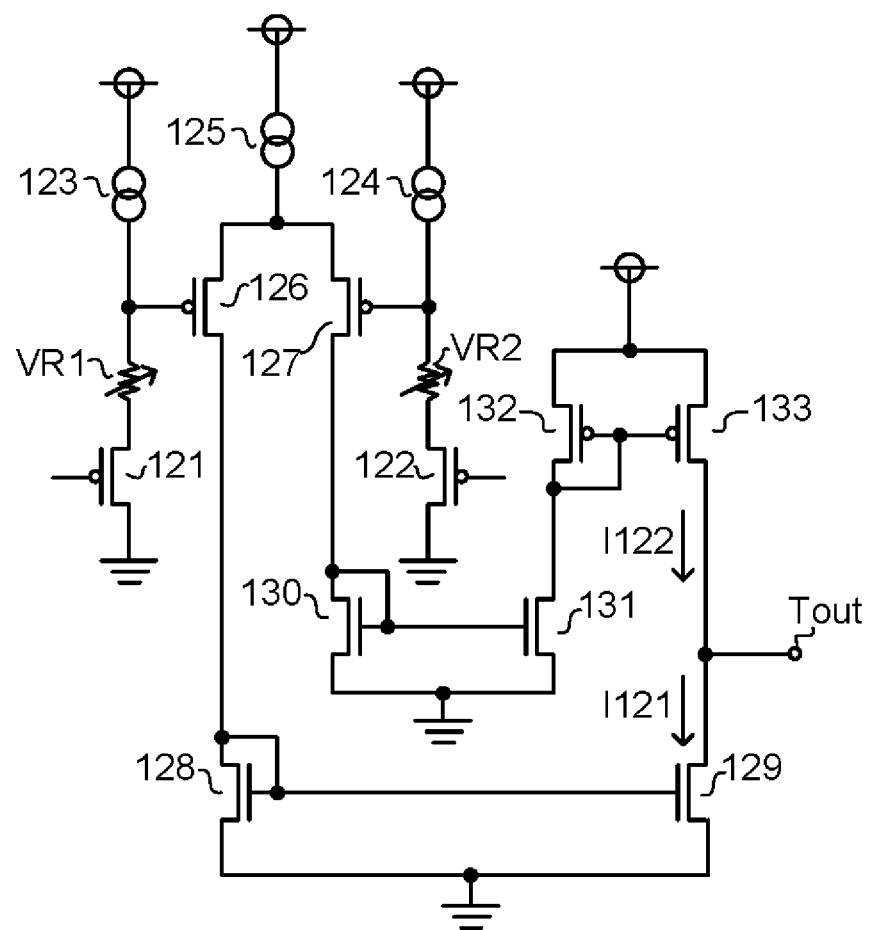
FIG. 16 is a circuit diagram of the differential circuit according to the conventional example.

The power supply device including the differential circuit according to this embodiment can be applied to various types of electronic devices. FIG. 13 illustrates an external view of a smartphone as an example of the electronic device.

A smartphone X illustrated in FIG. 13 includes, in an external view, an imaging unit X1 mounted on a front surface or a rear surface of a main body, an operation unit X2 (various buttons and the like) arranged to receive a user operation, and a display unit X3 arranged to display characters and images. Further, the display unit X3 has a touch panel function for receiving a user's touch operation.

When the electronic device of any type such as the smartphone is equipped with the power supply device including the differential circuit described above, it is possible to enjoy the merits thereof.

Note that various modifications can be made without deviating from the spirit of the technical creation concerning the various technical features described in this specification in addition to the embodiments described above. In other words, the embodiments described above are merely examples in every aspect and should not be interpreted as a limitation. The technical scope of the present invention should be defined not by the description of the embodiments but by the claims, and should be understood to include all modifications within the meanings and scope equivalent to the claims.

What is claimed is:

1. A differential circuit comprising:
    a first constant current circuit;
    a second constant current circuit having the same constant current value as the first constant current circuit;
    a current mirror including a first transistor having a current sink terminal connected to the first constant current circuit, a current drain terminal to which a first input voltage is applied, and a gate short-circuited to the current sink terminal, and a second transistor having a gate connected to the current sink terminal of the first transistor and a current drain terminal to which a second input voltage is applied; and
    a current output terminal connected to a connection node between the second constant current circuit and a part in which a current based on an output current of the current mirror flows,
    wherein a current-sensing voltage signal is applied as one of the first input voltage or the second input voltage and a reference voltage is applied as the other of the first input voltage or the second input voltage.

2. The differential circuit according to claim 1, further comprising a second current mirror having an input terminal connected to the current sink terminal of the second transistor and an output terminal connected to the second constant current circuit, wherein
    the current output terminal is connected to a connection node between the output terminal of the second current mirror and the second constant current circuit.

3. The differential circuit according to claim 2, wherein the second current mirror includes a first P-channel MOSFET having short-circuited drain and gate, and a source connected to an application terminal of the power supply voltage, and a second P-channel MOSFET having a gate connected to the gate of the first P-channel MOSFET and a source connected to the application terminal of the power supply voltage.

4. The differential circuit according to claim 1, further comprising an inverter stage including at least one inverter connected to a following stage side of the current output terminal.

5. The differential circuit according to claim 1, wherein the first transistor is an N-channel MOSFET and the second transistor is an N-channel MOSFET.

6. The differential circuit according to claim 1, wherein the current-sensing voltage signal is a voltage signal based on current flowing in a synchronous rectification transistor of a synchronous rectification type switching power supply device, and the reference voltage is a ground potential.

7. A power supply device comprising the differential circuit according to claim 1.

8. A power supply device comprising:
    an output stage arranged to generate a desired output voltage from an input voltage in accordance with on/off control of an upper side output transistor and a lower side synchronous rectification transistor; and
    the differential circuit according to claim 6 in which the current-sensing voltage signal is a voltage signal at a connection node between the output transistor and the synchronous rectification transistor.

9. An electronic device comprising the power supply device according to claim 7.

10. A differential circuit comprising:
    a first current mirror portion including a first transistor having a current drain terminal connected to a first input voltage and a second transistor having a current drain terminal connected to a second input voltage;
    a first constant current circuit disposed between a current sink terminal of the first transistor and an application terminal of a power supply voltage;
    an adjusting portion equipped with a second current mirror portion including a third transistor having a current drain terminal connected to a third input voltage and a fourth transistor having a current drain terminal connected to a fourth input voltage, and a second constant current circuit disposed between a current sink terminal of the third transistor and the application terminal of the power supply voltage; and
    an output terminal from which a current is output, wherein the adjusting portion generates a current flowing in the fourth transistor in accordance with the third input voltage and the fourth input voltage, with respect to a current flowing in the second transistor in accordance with the first input voltage and the second input voltage, so as to adjust the current output from the output terminal, wherein a current-sensing voltage signal is applied as one of the first input voltage or the second input voltage and a reference voltage is applied as the other of the first input voltage or the second input voltage.

11. The differential circuit according to claim 10, further comprising a third current mirror portion arranged to generate a first current in accordance with an input of the current flowing in the second transistor, and a third constant current circuit, wherein the adjusting portion further includes a fourth current mirror portion arranged to generate a second current in accordance with an input of the current flowing in the fourth transistor, and a fourth constant current circuit, and the output terminal is connected to a connection node between an output portion of the third current mirror portion and the third constant current circuit, and to a connection node between an output portion of the fourth current mirror portion and the fourth constant current circuit.

\* \* \* \* \*